(12) United States Patent
Schumacher et al.

(10) Patent No.: US 7,669,037 B1
(45) Date of Patent: Feb. 23, 2010

(54) METHOD AND APPARATUS FOR COMMUNICATION BETWEEN A PROCESSOR AND HARDWARE BLOCKS IN A PROGRAMMABLE LOGIC DEVICE

(75) Inventors: Paul R. Schumacher, Berthoud, CO (US); Kornelis Antonius Vissers, Sunnyvale, CA (US)

(73) Assignee: Xilinx, Inc., San Jose, CA (US)

( * ) Notice: Subject to any disclaimer, the term of this patent is extended or adjusted under 35 U.S.C. 154(b) by 369 days.

(21) Appl. No.: 11/076,797

(22) Filed: Mar. 10, 2005

(51) Int. Cl.
*G06F 15/76* (2006.01)
(52) U.S. Cl. .......................................... 712/34; 712/35
(58) Field of Classification Search ................. 712/220, 712/34, 35
See application file for complete search history.

(56) References Cited

U.S. PATENT DOCUMENTS

| | | | | |
|---|---|---|---|---|
| 3,918,030 A | * | 11/1975 | Walker | 712/212 |
| 4,862,407 A | * | 8/1989 | Fette et al. | 712/35 |
| 5,001,624 A | * | 3/1991 | Hoffman et al. | 710/5 |
| 5,077,664 A | * | 12/1991 | Taniai et al. | 710/22 |
| 5,276,821 A | * | 1/1994 | Imai et al. | 712/214 |
| 5,392,391 A | | 2/1995 | Caulk et al. | |
| 5,442,789 A | * | 8/1995 | Baker et al. | 718/105 |
| 5,497,501 A | | 3/1996 | Kohzono et al. | |
| 5,778,244 A | * | 7/1998 | Putnins et al. | 712/15 |
| 5,990,910 A | * | 11/1999 | Laksono et al. | 345/503 |
| 6,055,373 A | * | 4/2000 | McElroy et al. | 712/35 |
| 6,340,644 B1 | * | 1/2002 | Becker et al. | 438/782 |
| 6,408,382 B1 | | 6/2002 | Pechanek et al. | |
| 6,631,433 B1 | | 10/2003 | Paluzzi | |
| 2003/0005261 A1 | * | 1/2003 | Sheaffer | 712/35 |
| 2003/0009651 A1 | * | 1/2003 | Najam et al. | 712/34 |
| 2003/0028751 A1 | * | 2/2003 | McDonald et al. | 712/34 |
| 2004/0193852 A1 | * | 9/2004 | Johnson | 712/226 |
| 2005/0033875 A1 | | 2/2005 | Cheung et al. | |
| 2005/0177674 A1 | | 8/2005 | Ober et al. | |
| 2005/0223131 A1 | | 10/2005 | Goekjian et al. | |
| 2005/0228966 A1 | * | 10/2005 | Nakamura | 712/1 |
| 2005/0278502 A1 | * | 12/2005 | Hundley | 712/34 |
| 2008/0256521 A1 | * | 10/2008 | O'Brien et al. | 717/133 |
| 2009/0037911 A1 | * | 2/2009 | Ahuja et al. | 718/100 |

OTHER PUBLICATIONS

"Making sense of Programmable Logic," Michael Barr; Mar. 2, 2004, http://www.oreillynet.com/lpt/a/4658.*
DeHon, Andre; Transit Note #118, Notes on Coupling Processors with Reconfigurable Logic; Mar. 1995.*
Yuichi Nakamura et al.; "A Fast Hardware/Software Co-Verification Method for System-On-a-Chip by Using a C/C++ Simulator and FPGA Emulator with Shared Register Communication"; DAC 2004; Jun. 7-11, 2004; Copyright 2004; pp. 299-304.

(Continued)

*Primary Examiner*—Eddie P Chan
*Assistant Examiner*—Keith Vicary
(74) *Attorney, Agent, or Firm*—Robert M. Brush; Lois D. Cartier

(57) ABSTRACT

Method and apparatus for communication between hardware blocks and a processor in a programmable logic device is described. A shared memory is provided along with a memory controller for controlling access to the shared memory. An interface is configured to receive auxiliary instructions from the processor, select the hardware blocks for the requested tasks in response to the auxiliary instructions, notify the hardware blocks of those tasks, and arbitrate access to the memory controller among the hardware blocks.

20 Claims, 9 Drawing Sheets

OTHER PUBLICATIONS

U.S. Appl. No. 11/076,798, filed Mar. 10, 2005; Turney, Robert D. et al., Method and Apparatus for Communication Between a Processor and Hardware Blocks in a Programmable Logic Device, 33 pages, available from Xilinx, Inc., 2100 Logic Drive, San Jose, California 95124.

Schumacher, Paul et al., "A Virtual Socket Framwork For Rapid Emulation Of Video And Multimedia Designs", Jul. 2005, pp. 1-4, available from IEEE, 3 Park Avenue, 17th Floor, New York, NY 10016-5997.

U.S. Appl. No. 10/912,844, filed Aug. 6, 2004, Ansari, Ahmed et al., "Coprocessor Interface Controller", 119 pages, available from Xilinx, Inc., 2100 Logic Drive, San Jose, CA 95124.

* cited by examiner

ADDRESS ALLOCATION

| SOCKET # | READ-ONLY REG FILE | | WRITE-ONLY REG FILE | |
|---|---|---|---|---|
| | START | END | START | END |
| MASTER - 0 | 0 | M-1 | N*M | (N+1)*M-1 |
| 1 | M | 2*M-1 | (N+1)*M | (N+2)*M-1 |
| 2 | 2*M | 3*M-1 | (N+2)*M | (N+3)*M-1 |
| 3 | 3*M | 4*M-1 | (N+3)*M | (N+4)*M-1 |
| 4 | 4*M | 5*M-1 | (N+4)*M | (N+5)*M-1 |
| | | | | |
| N | (N-1)*M | N*M-1 | (2*N-1)*M | 2*N*M-1 |

| SOCKET # | READ-ONLY BLOCK MEM | | WRITE-ONLY BLOCK MEM | |
|---|---|---|---|---|
| | START | END | START | END |
| MASTER - 0 | 2*N*M | (2*N+1)*M-1 | 3*N*M | (3*N+1)*M-1 |
| 1 | (2*N+1)*M | (2*N+2)*M-1 | (3*N+1)*M | (3*N+2)*M-1 |
| 2 | (2*N+2)*M | (2*N+3)*M-1 | (3*N+2)*M | (3*N+3)*M-1 |
| 3 | (2*N+3)*M | (2*N+4)*M-1 | (3*N+3)*M | (3*N+4)*M-1 |
| 4 | (2*N+4)*M | (2*N+5)*M-1 | (3*N+4)*M | (3*N+5)*M-1 |
| | | | | |
| N | (3*N-1)*M | 3*N*M-1 | (4*N-1)*M | 4*N*M-1 |

METHOD AND APPARATUS FOR COMMUNICATION BETWEEN A PROCESSOR AND HARDWARE BLOCKS IN A PROGRAMMABLE LOGIC DEVICE

FIELD OF THE INVENTION

One or more aspects of the present invention relate generally to processing systems and, more particularly, to a method and apparatus for communication between a processor and hardware blocks in a programmable logic device.

BACKGROUND OF THE INVENTION

Traditional complex processing systems are typically implemented using software running on a microprocessor in conjunction with multiple dedicated hardware blocks. Examples of processing systems employing mixed hardware/software descriptions include various MPEG (moving picture experts group) systems for processing multimedia content, such as MPEG-4 systems. In MPEG-4, standardization efforts have resulted in a software description of the compression algorithm from which mixed hardware/software implementations can be derived. In such systems, the hardware blocks are capable of performing complex functions more efficiently than such functions could be performed using pure software.

Supporting mixed hardware/software designs of a processing system with appropriate test and emulation platforms is critical to their deployment and acceptance in the industry. The conventional approach for testing and verifying such a design involves the application of a large number of test vectors to a software simulation of the design. As design complexity increases, however, simulation times are becoming prohibitively long on current desktop computers.

Another approach for testing and verifying designs involves the use of a test engine running on a standard computation device (e.g., a computer) in communication with hardware emulators. The hardware emulators allow for more accurate and efficient simulation of the hardware portion of the design. The hardware emulators may be implemented using hardware blocks in a programmable logic device (PLD), such as a field programmable gate array (FPGA). PLDs exist as a well-known type of integrated circuit (IC) that may be programmed by a user to perform specified logic functions.

The interface between the standard computation device and the hardware emulators is becoming increasingly important as processing system designs become more complex. For video and multimedia designs that involve an enormous amount of data to be processed, communication between a test engine running on a standard computation device and hardware emulators configured in a PLD is one of the primary bottlenecks that affect the test/verification process.

Accordingly, there exists a need in the art for an improved method and apparatus for communication between a processor and hardware blocks configured in a programmable logic device.

SUMMARY OF THE INVENTION

Method and apparatus for communication between a processor and hardware blocks configured in a programmable logic device is described. One aspect of the invention relates to communication between hardware blocks configured in a programmable logic device and a computation device external to the programmable logic device. A bus controller is provided for receiving words from, and transmitting words to, the computation device. At least one first-in-first-out buffer (FIFO) is provided for communication with the bus controller to store the words. A Processing engine is provided having a memory space associated with the hardware blocks. The processing engine is configured to receive the words in the FIFO(s). An address decoder is provided for decoding an address component of the words in the FIFO(s) to obtain addresses of memory locations in the memory space. A strobe generator is provided for coupling a strobe signal to the processing engine. The strobe signal is configured to store the words in the respective memory locations.

In another embodiment, communication between hardware blocks and a processor in a programmable logic device is described. A shared memory is provided along with a memory controller for controlling access to the shared memory. An interface is configured to receive auxiliary instructions from the processor, select the hardware blocks for the requested tasks in response to the auxiliary instructions, notify the hardware blocks of those tasks, and arbitrate access to the memory controller among the hardware blocks.

BRIEF DESCRIPTION OF THE DRAWINGS

Accompanying drawing(s) show exemplary embodiment(s) in accordance with one or more aspects of the invention; however, the accompanying drawing(s) should not be taken to limit the invention to the embodiment(s) shown, but are for explanation and understanding only.

FIG. 3 is a table depicting an exemplary address allocation scheme in accordance with one or more aspects of the invention;

DETAILED DESCRIPTION OF THE DRAWINGS

Figure 1:
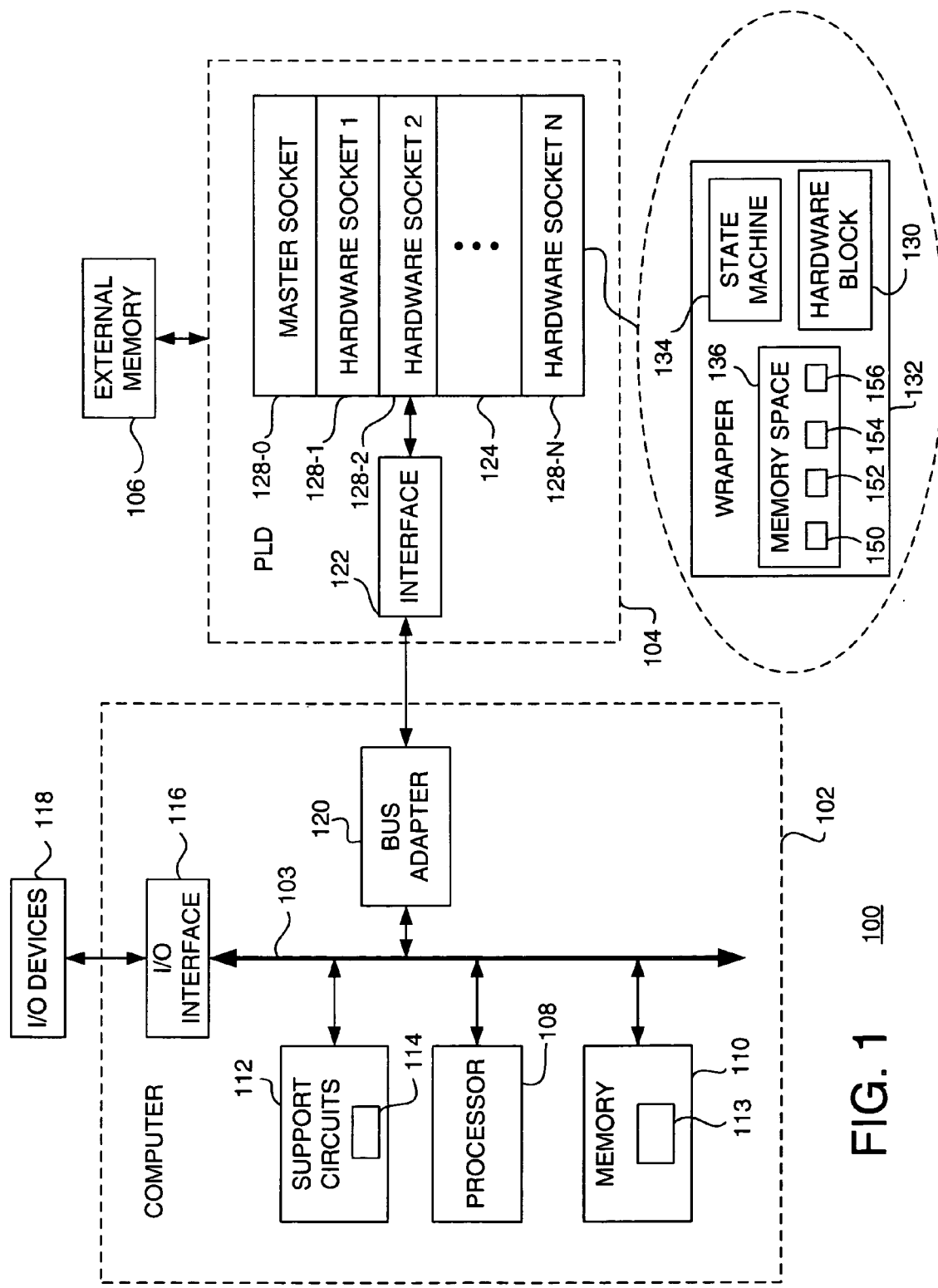
FIG. 1 is a block diagram depicting an exemplary embodiment of a processing system constructed in accordance with one or more aspects of the invention.

FIG. 1 is a block diagram depicting an exemplary embodiment of a processing system 100 constructed in accordance with one or more aspects of the invention. The system 100 includes a computer 102 in communication with a programmable logic device (PLD) 104. The PLD 104 may be in communication with external memory 106. In general, the computer 102 is configured to execute software code that makes use of one or more hardware blocks configured in the PLD 104. The hardware blocks may act as "hardware accelerators" configured to perform particular functions more efficiently than software implementations of such functions. In addition, the hardware blocks may act as "hardware emulators" for more realistic and efficient testing and verification of a design.

In particular, the computer 102 includes a processor 108, memory 110, support circuits 112, an input/output (I/O) interface 116, and a bus adapter 120, each of which is in communication with a system bus 103. The processor 108 may be any type of microprocessor known in the art. The support circuits 112 for the processor 108 include conventional cache, power supplies, clock circuits, data registers, I/O interfaces, and the like, as well as a bus arbiter 114. The bus arbiter 114 determines which circuit in the computer 102 has control of the system bus 103. The system bus 103 may comprise any type of bus known in the art, such as a typical local bus found in many personal computers known in the art.

The I/O interface 116 may be in communication with various I/O devices 118, such as a conventional keyboard, mouse, printer, display, and the like. The bus adapter 120 is configured to couple the PLD 104 to the system bus 103. The bus adapter 120 acts as a bridge between buses and allows transfers to take place between the PLD 104 and other devices coupled to the system bus 103, such as the processor 108 and the memory 110. For example, the bus adapter 120 may comprise a local bus to peripheral component interface (PCI) bus bridge or like type bus adapter known in the art. Alternatively, the PLD 104 could support a number of other bus formats known in the art (e.g., the PLD 104 may be configured with USB, FireWire, or other bus formats). The memory 110 stores software 113 to be executed by the processor 108.

Figure 6:
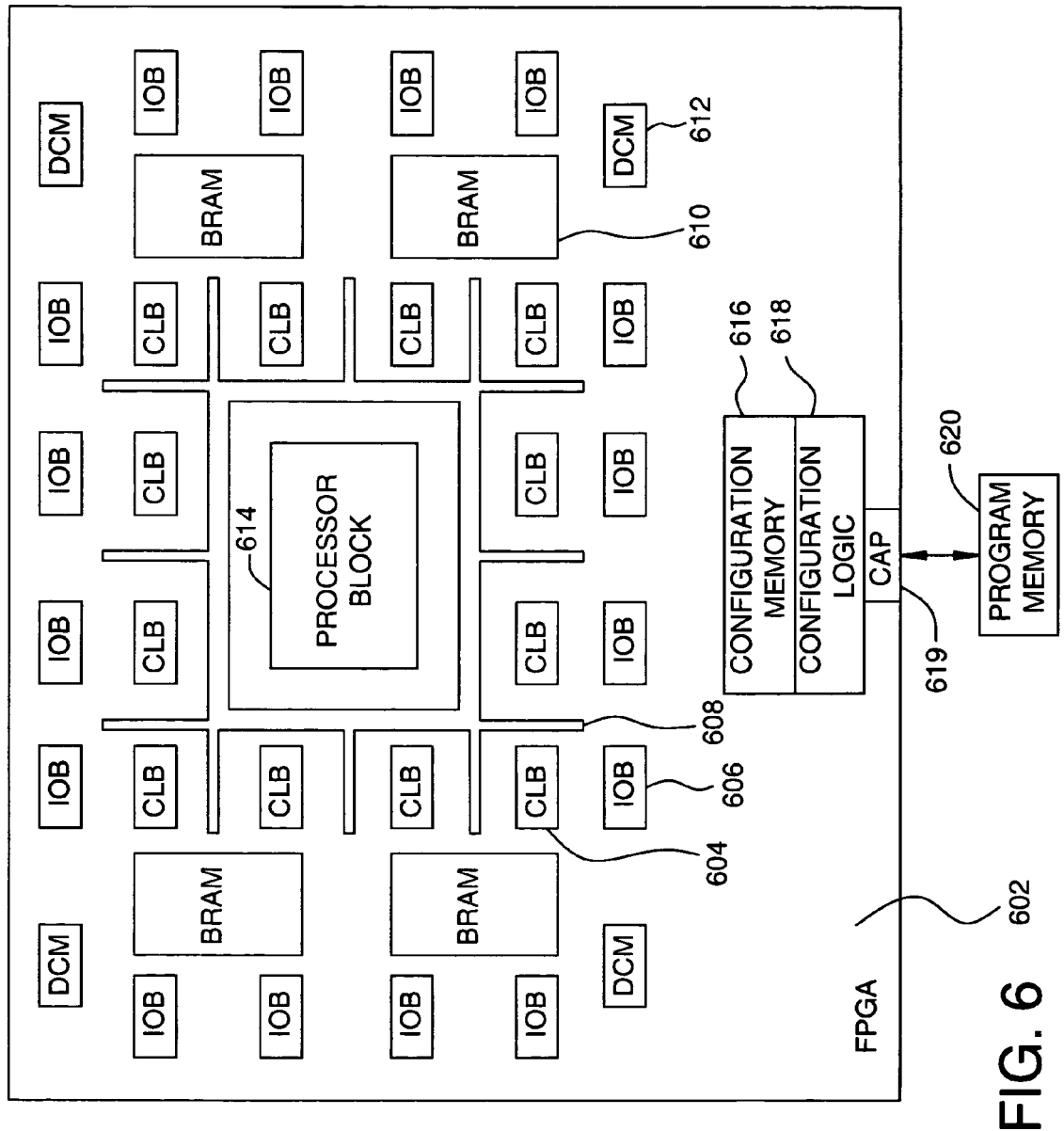
FIG. 6 is a block diagram depicting an exemplary embodiment of an FPGA coupled to a program memory.

The PLD 104 is configured with an interface 122 in communication with a processing engine 124. The processing engine 124 includes sockets 128-0 through 128-N (collectively referred to as sockets 128), where N is an integer. The sockets 128 include a master socket 128-0 and N hardware sockets 128-1 through 128-N. The sockets 128-1 through 128-N may include various hardware blocks. The master socket 128-0 may be used to identify the presence of hardware blocks in the sockets 128-1 through 128-N and to control transfers between the PLD 104 and the external memory 106. The PLD 104 may comprise a field programmable gate array (FPGA) or like type device known in the art. An exemplary FPGA is shown in FIG. 6.

The interface 122 is configured to provide access to the sockets 128 for use by the computer 102. In general, the interface 122 controls the transfer of data, address, and control information between the processing engine 124 and the system bus 103. The software 113 running on the processor 108 may access the sockets 128 through the interface 122. An exemplary embodiment of a flow control mechanism implemented by the interface 122 is described below with respect to FIGS. 4 and 5.

Each of the sockets 128 comprises a hardware block 130 and a wrapper 132. The wrapper 132 provides a standard interface to the hardware block 130. That is, each of the sockets 128 includes a standard interface to its respective hardware block. The wrapper 132 includes a data transfer state machine 134 and a memory space 136. The data transfer state machine 134 is configured to communicate with the interface 122 and to control data flow to and from the hardware block 130. The memory space 136 includes a write-only register file 150, a read-only register file 152, a write-only block memory 154, and read-only block memory 156. The terms "write" and "read" are defined with respect to the interface 122. That is, the interface 122 stores data to the write-only memories 150 and 154 and reads data from the read-only memories 152 and 156. Conversely, the hardware block 130 reads data from the write-only memories 150 and 154 and writes data to the read-only memories 152 and 156.

The register file memories 150 and 152 are used for writing and reading control signals. The write-only register file 150 is used to store flags and parameters that are required by the hardware block 130 (e.g., a status flag indicating the presence of input data). The read-only register file 152 is used to convey various flags and parameters computed by the hardware block 130 (e.g., a status flag indicating the presence of completed output data). The read-only register file 152 can also contain any information that the hardware block 130 would like to transmit to the computation device (e.g., functional capabilities, estimated performance of specified tasks, etc.). The block memories 154 and 156 are used for transferring data between the interface 122 and the hardware block 130. For example, the hardware block 130 may be a discrete cosine transform (DCT) circuit for performing DCT operations. Input data comprising blocks of pixel values are received through the interface 122 and stored in the write-only block memory 154. Output data comprising blocks of DCT coefficients are stored in the read-only block memory 156 and read-out through the interface 122. An exemplary configuration for the memory space 136 of a socket is described immediately below with respect to FIG. 2.

Figure 2:
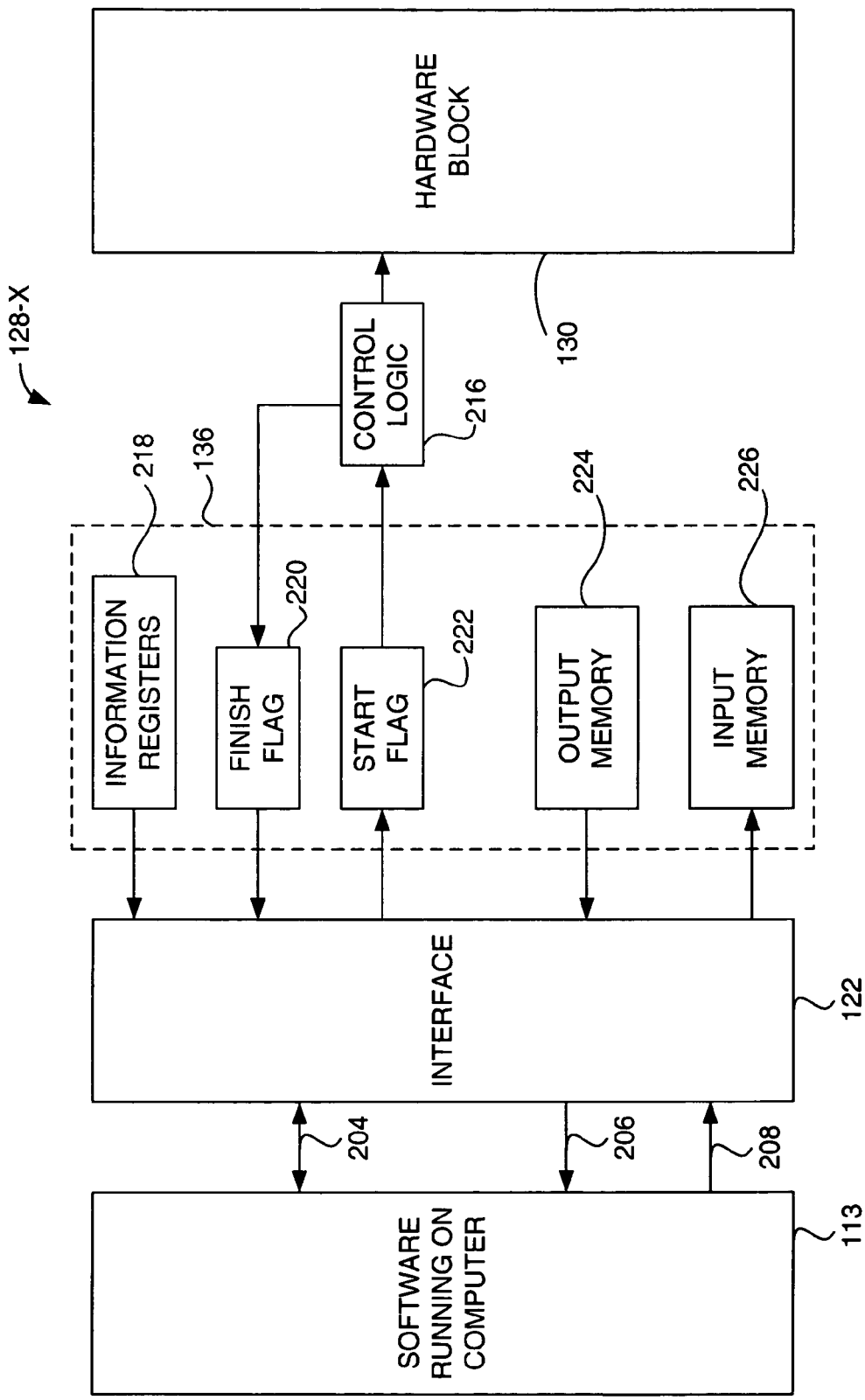
FIG. 2 is a functional block diagram depicting an exemplary embodiment an interface between software running on a processor and a hardware block of the processing system in FIG. 1.

FIG. 2 is a functional block diagram depicting an exemplary embodiment an interface between the software 113 running on the processor 108 and a socket 128-X of the sockets 128 in the processing engine 124. The memory space 136 includes one or more information registers 218, a finish flag register 220, a start flag register 222, output memory 224, and input memory 226. The wrapper 132 for the socket 128-X includes control logic 216. The information registers 218 and the finish flag 220 form the read-only register file space, and the start flag 222 forms the write-only register file space. The output memory 224 forms the read-only block memory space, and the input memory 214 forms the write-only block memory space.

Data is written to the input memory 226 by the software 113 via path 208 to the interface 122. The hardware block 130 is configured to read the input data from the input memory 226 for processing. The hardware block 130 is configured to stored output data to the output memory 224. The output data is read by the software 113 via path 206 from the interface 122. Various protocols may be used to perform the data transfer to the input memory 226 (e.g., streaming data based on empty/full flags of the input memory 226). One method is the use of a start flag register 222. The software 113 sets the start flag register 222 via control path 204 to the interface 122. The control logic 216 detects the state of the start flag register 222 and signals the hardware block 130 to begin processing input data in the input memory 226.

The hardware block 130 signals the control logic 216 after processing is complete and output data is stored in the output memory 224. In response, the control logic 216 sets the finish flag register 220. Various protocols may be used to perform the data transfer from the output memory 224 (e.g., streaming data based on empty/full flags of the output memory 224, interrupt signals sent from the interface 122 to the processor 108). One method is the use of a finish flag register 220 that is polled by the software 113 running on microprocessor 108. The software 113 periodically polls the state of the finish flag register 220 and reads data from the output memory 224 in response to the finish flag register 220 being set. The information registers 218 may be used to store data indicative of the capabilities of the hardware block 130. For example, the information registers 218 may be configured to store a list of task(s) that the hardware block 130 is capable of performing, as well as a cost function related to how fast the hardware block 130 can perform the task(s).

FIG. 3 is a table 300 depicting an exemplary address allocation scheme that may be employed with respect to the memory space 136 for each of the sockets 128. In the present example, there are N sockets 128 and M address locations in each of the memory spaces 150 through 156 for each of the sockets 128 where M is an integer). The software 113 may access the memories in the sockets 128 in accordance with the addresses in the table 300 (i.e., the write-only register file 150, the read-only register file 152, the write-only block memory 154, and the read-only block memory 156).

In particular, a column 302 in the table 300 indicates the socket number ranging from zero (the master socket 128-0) through N (the socket 128-n). A portion 304 of the table 300 indicates an exemplary address allocation for the read-only register file 152 in each of the sockets 128. In the present example, the read-only register file 152 for the master socket 128-0 starts at address 0 and ends at address M−1. The read-only register file 152 for the socket 128-1 starts at address M and ends at address 2M−1, and so on until the read only register file 152 for the socket 128-N starts at address (N−1)M and ends at address NM−1.

A portion 306 of the table 300 indicates an exemplary address allocation for the write-only register file 150 in each of the sockets 128. The write-only register file 150 for the master socket 128-0 begins at address NM and ends at address (N+1)M−1, and so on until the write-only register file 150 for the socket 128-N begins at address (2N−1)M and ends at address 2NM−1. A portion 308 of the table 300 indicates an exemplary address allocation for the read-only block memory 156 in each of the sockets 128. The read-only block memory 156 for the master socket 128-0 begins at address 2NM and ends at address (2N+1)M−1, and so on until the read-only block memory 156 for the socket 128-N begins at address (3N−1)M and ends at address 3NM−1. Finally, a portion 310 of the table 300 indicates an exemplary address allocation for the write-only block memory 154 in each of the sockets 128. The write-only block memory 154 for the master socket 128-0 begins at address 3NM and ends at address (3N+1)M−1, and so on until the write-only block memory 154 for the socket 128-N begins at address (4N−1)M and ends at address 4NM−1.

Returning to FIG. 1, in one embodiment, the read-only register file 152 of the master socket 128-0 is configured to store a hardware identification value. The hardware identification value provides information related to which of the sockets 128 in the processing engine 124 includes a hardware block. In one embodiment, the hardware identification value comprises an N+1 bit word, where each bit indicates the presence (e.g., a "1" value) or the absence (e.g., a "0" value) of a hardware block in a respective one of the sockets 128. That is, the least significant bit is associated with the master socket 128-0 and the most significant bit is associated with the socket 128-N. For example, the hardware identification value "00000 . . . 00001000011" indicates that the master socket 128-0 and sockets 128-1 and 128-6 include hardware blocks.

The software 113 may access the read-only register file 152 in the master socket 128-0 to read the hardware identification value and determine which of the sockets 128 may be used for processing. In one embodiment, functionality of the available sockets is determined using a predefined table of socket numbers and their corresponding hardware functionality. In another embodiment, the read-only register file 152 in the master socket 128-0 is configured to store information related to the functionality of the hardware block in each of the available sockets. As the PLD 104 is programmable and partial reconfiguration of PLD 104 is possible, individual hardware blocks in the sockets 128 may change dynamically over time, thus modifying the value of read-only register file 152. The polling of the register file 152 can be performed by either the software 113 or by the interface 122 and future tasks allocated accordingly.

Figure 4:
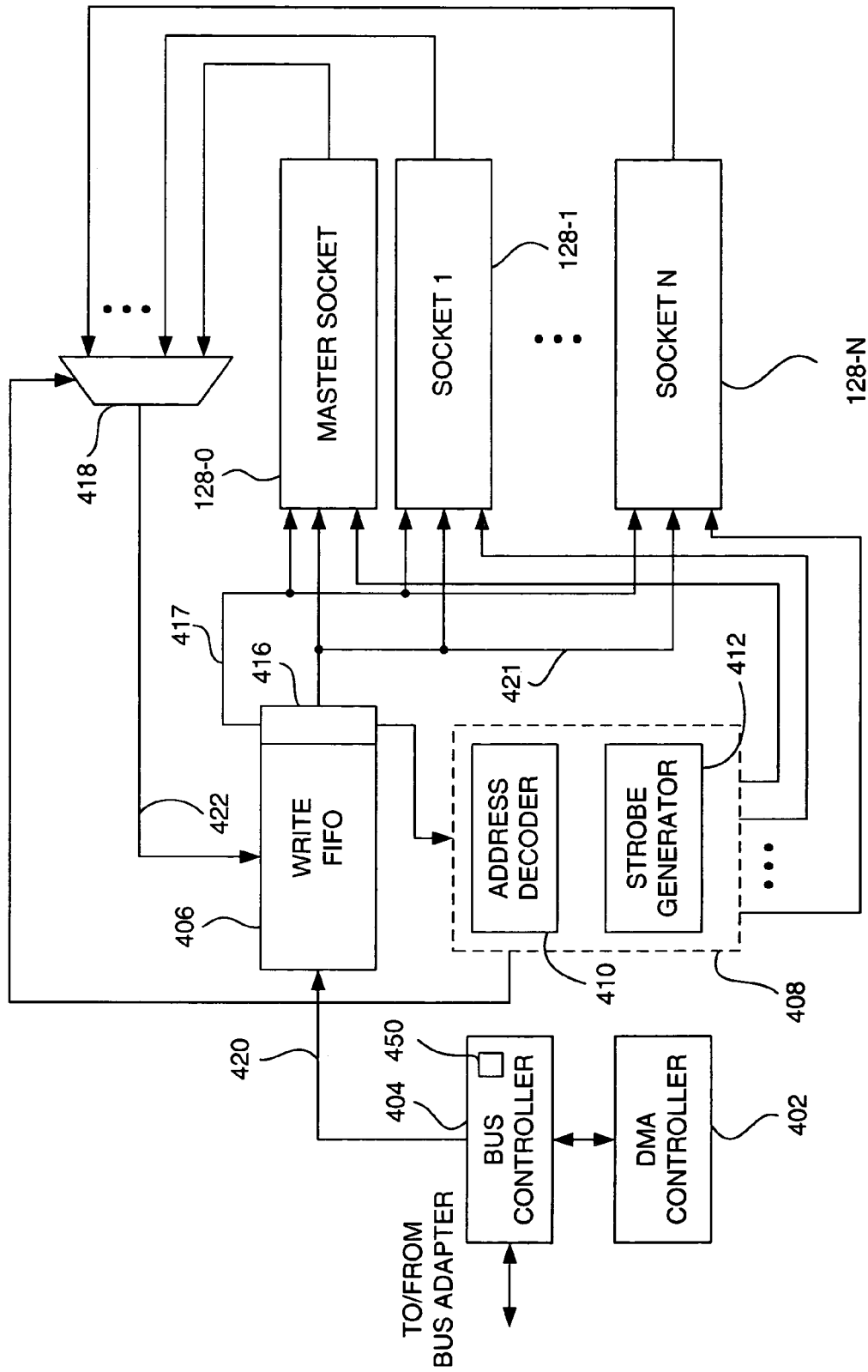
FIGS. 4 and 5 are block diagrams depicting an exemplary embodiment of a interface between a processor and multiple hardware blocks in accordance with one or more aspects of the invention.
Figure 5:
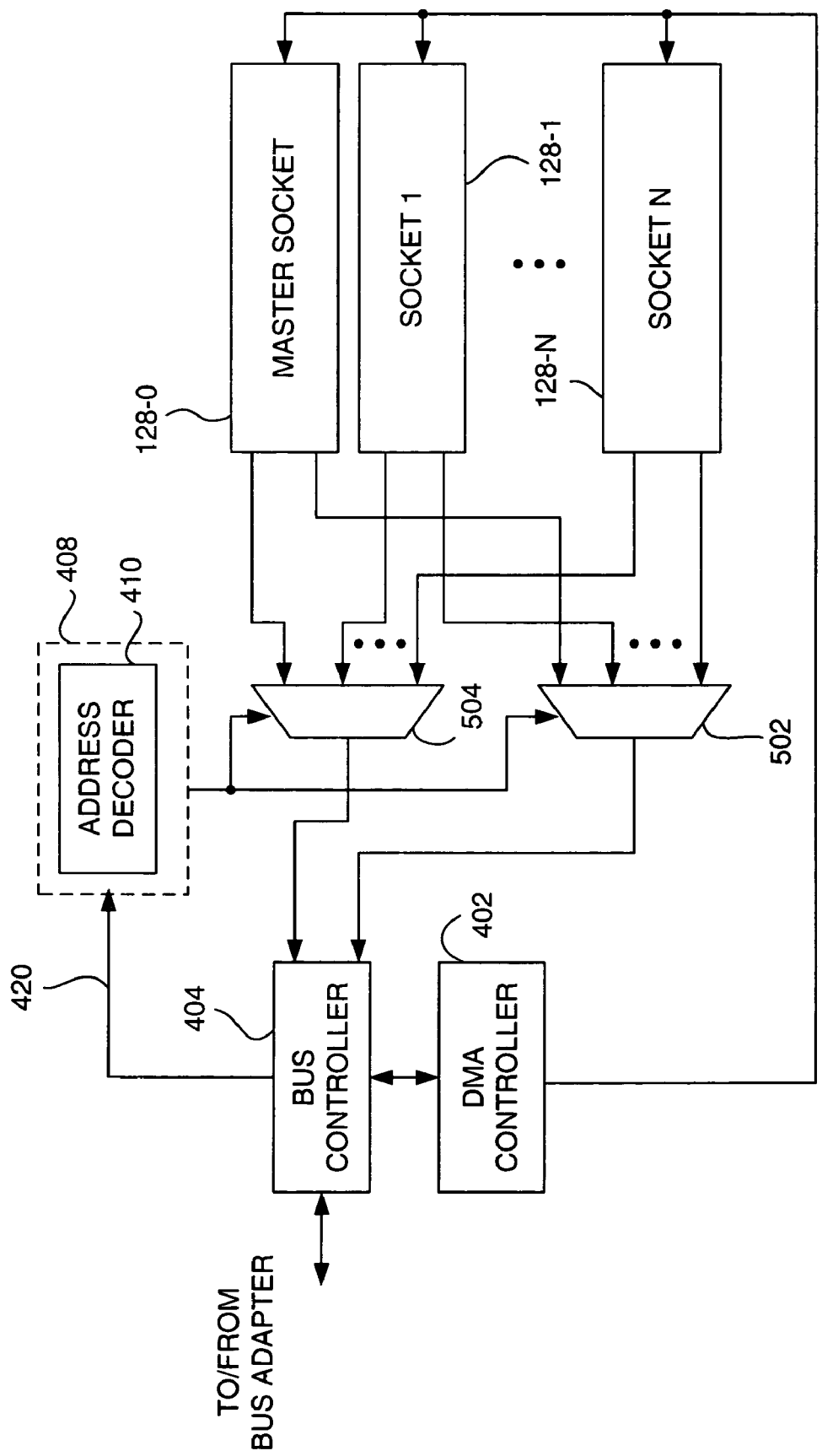

FIGS. 4 and 5 are block diagrams depicting an exemplary embodiment of the interface 122 coupled to the sockets 128 in accordance with one or more aspects of the invention. In particular, FIG. 4 depicts a portion 400 of the interface 122 related to writing data to the sockets 128. FIG. 5 depicts a portion 500 of the interface 122 related to reading data from the sockets 128. Identical elements in FIGS. 4 and 5 are designated with identical reference numerals. For purposes of clarity, elements specific to reading data from the sockets 128 are omitted from FIG. 4. Likewise, elements specific to writing data to the sockets 128 are omitted from FIG. 5.

The interface 122 employs a flow control mechanism to control writing to, and reading from, the memory space of the sockets 128. Referring to FIGS. 1, 4, and 5, the interface 122 includes a bus controller 404 and a direct memory access (DMA) controller 402. The bus controller 404 is configured for communication with the bus adapter 120. A port of the bus controller 404 is in communication with a port of the DMA controller 402.

The DMA controller 402 includes internal registers (not shown) that control its operation. The internal registers typically include an address register, a byte count register, and a control register, such registers being well known in the art. For a data transfer from the bus adapter to the interface 122, the address register is loaded with the desired memory address in which to store the data. The memory address is defined with respect to the combined memory space of the sockets 128 (e.g., the example shown in FIG. 3). The byte count register is loaded with the number of bytes to be transferred, and the control register is loaded with control data (e.g., data indicative of the direction of the transfer). The internal registers may be loaded with their respective data by the processor 108. Such initialization of the DMA controller 402 is well known in the art.

After the internal registers are initialized, the DMA controller 402 signals the bus controller 404 that it should request control of the system bus 103. The bus controller 404 is configured for bus mastering such that the interface 122 is capable of becoming a master of the system bus 103. The bus controller 404 negotiates with the bus arbiter 114 for control of the system bus 103. Once the bus controller 404 has control of the system bus 103, the DMA controller 402 then controls the DMA transfer between the memory 110 and the interface 122. When the DMA transfer is complete, the DMA controller 402 notifies the bus controller 404 that it no longer requires control of the system bus 103. The bus controller 404 then relinquishes control of the system bus 103 to the bus arbiter 114. By employing the PLD 104 as a bus master, this embodiment of the invention reduces overhead with respect to communication between the PLD 104 and the computer 102.

Referring specifically to FIG. 4, the interface 122 further includes write first-in-first-out circuitry (write FIFO) 406, control logic 408, and a multiplexer 418. An output port of the bus controller 404 is coupled to a data input port 420 of the write FIFO 406. A data output port 421 of the write FIFO 406 is coupled to an input port of each of the sockets 128. In one embodiment, the write FIFO 406 includes a single FIFO for the entire interface 122. In another embodiment, the write FIFO 406 includes a separate FIFO for each of the sockets 128. In such an embodiment, the bus controller 404 includes de-multiplexing logic 450 for selecting a FIFO for loading data therein. Use of a FIFO for each of the sockets 128 allows the hardware blocks in the sockets 128 to accept data at their own desired rates, which can be different for each of the hardware blocks.

The write FIFO 406 comprises multiple memory locations, which include a top memory location ("top 416"). The control logic 408 is in communication with the write FIFO 406 to read data at the top 416. The control logic 408 includes an address decoder 410 and a strobe generator 412. The control logic 408 includes N+1 output ports respectively coupled to input ports of the sockets 128-0 through 128-N. Each of the sockets 128 is in communication with the write FIFO 406 via a path 417 to read data at the top 416. The multiplexer 418 includes N+1 input ports respectively coupled to output ports of the sockets 128-0 through 128-N. An output port of the multiplexer 418 is coupled to a pop control terminal 422 of the write FIFO 406.

In operation, information to be processed by the sockets 128 is transferred from the computer 102 (e.g., from the memory 110) to the write FIFO 406 using the DMA/bus mastering process described above. In particular, the bus controller 404 pushes each received word into the write FIFO 406 via the data input port 420. Each received word includes one or more of an address component, a control component, and a data component.

The address decoder 410 reads the address component of the word at the top 416 of the write FIFO 406 and decodes the address. That is, the address decoder 410 determines which memory location in the combined memory space of the sockets 128 is being addressed. The strobe generator 412 then provides a strobe signal to the addressed memory location in the address one of the sockets 128. For example, in accordance with the exemplary allocation scheme of FIG. 3, an address of (3N+3)M refers to the write-only block memory 154 of the socket 128-3. After decoding the address (3N+3)M, the strobe generator 412 would generate a strobe signal for the write-only block memory 154 of the socket 128-3.

Each of the sockets 128 may read a write valid flag from the word at the top 416 of the write FIFO 406 via the path 417. The write valid flag comprises at least a portion of the control component of the word at the top 416 of the write FIFO 406. For each of the sockets 128, the write valid flag indicates that the word at its input is valid. If valid, the word at the top 416 of the write FIFO 406 is stored in the addressed memory location in the address one of the sockets 128 in accordance with the strobe signal generated by the strobe generator 412. After the word is stored, the addressed one of the sockets 128 asserts a write ready signal to the multiplexer 418. The multiplexer 418 selects the write read signal of the addressed one of the sockets 128, which pops the write FIFO 406 and cause the next word to be located at the top 416 of the write FIFO 406. The process is then repeated. In this manner, information may be transferred from the computer 102 to one or more of the sockets 128. The selection control for the multiplexer 418 is performed by the address decoder 410. In one embodiment, data is written to the same socket as long as the write FIFO 406 is not empty.

Referring specifically to FIG. 5, the interface 122 further includes a multiplexer 502 and a multiplexer 504. An output port of the bus controller 404 is coupled to the control logic 408. An output port of the control logic 408 is coupled to a control terminal of each of the multiplexers 502 and 504. Output ports of the multiplexers 502 and 504 are coupled to input ports of the bus controller 404. Input ports of the multiplexer 504 are coupled to data output ports of the sockets 128. Input ports of the multiplexer 502 are coupled to strobe output ports of the sockets 128. An output port of the DMA controller 402 is coupled to an input port of each of the sockets 128.

In operation, information produced by the sockets 128 is transferred from the PLD 104 to the computer 102 using the DMA/bus mastering process described above. In particular, the bus controller 404 receives a read request from the computer 102. The address decoder 410 decodes an address component of the read request to determine which memory location in the combined memory space of the sockets 128 is being addressed. The control logic 408 provide a control signal to the multiplexers 502 and 504 to select a socket of the sockets 128 in accordance with the address decoded by the address decoder 410. For example, in accordance with the exemplary allocation scheme of FIG. 3, an address of (2N+3)M refers to the read-only block memory 152 of the socket 128-3. After decoding the address (2N+3)M, the control logic 408 causes the multiplexer 504 to select the data output port of the socket 128-3, and the multiplexer 502 to select the strobe output port of the socket 128-3.

In response to the read request, the bus controller 404 becomes the master of the system bus 103, as described above. The bus controller 404 notifies the DMA controller 402 that it has control of the system bus 103, and the DMA controller 402 notifies the sockets 128 to begin transferring data to a specified address in the memory 110. As described above, the internal registers 403 of the DMA controller 402 are initialized with address and control information for the transfer. The addressed one of the sockets 128 provides the data to the bus controller 404 through the multiplexer 504, and provides the strobe signal for the memory 110 to the bus controller 404 through the multiplexer 502. The information is then coupled to the system bus 103 such that the data is stored in the memory 110. The process is then repeated for each read request. In this manner, information may be transferred from the PLD 104 to the computer 102.

FIG. 6 is a block diagram depicting an exemplary embodiment of an FPGA 602 coupled to a program memory 620. The FPGA 602 may be used as the PLD 104 in the system 100 of FIG. 1. The FPGA 602 illustratively comprises programmable logic circuits or "blocks", illustratively shown as CLBs 604, IOBs 606, and programmable interconnect 608 (also referred to as "programmable logic"), as well as configuration memory 616 for determining the functionality of the FPGA 602. The FPGA 602 may also include an embedded processor block 614, as well as various dedicated internal logic circuits, illustratively shown as blocks of random access memory ("BRAM 610"), configuration logic 618, and digital clock management (DCM) blocks 612. Those skilled in the art will appreciate that the FPGA 602 may include other types of logic blocks and circuits in addition to those described herein.

As is well known in the art, the IOBs 606, the CLBs 604, and the programmable interconnect 608 may be configured to perform a variety of functions. Notably, the CLBs 604 are programmably connectable to each other, and to the IOBs 606, via the programmable interconnect 608. Each of the CLBs 604 may include one or more "slices" and programmable interconnect circuitry (not shown). Each CLB slice in turn includes various circuits, such as flip-flops, function generators (e.g., a look-up tables (LUTs)), logic gates, memory, and like type well-known circuits. The IOBs 606 are configured to provide input to, and receive output from, the CLBs 604.

Configuration information for the CLBs 604, the IOBs 606, and the programmable interconnect 608 is stored in the configuration memory 616. The configuration memory 616 may include static random access memory (SRAM) cells.

The configuration logic 618 provides an interface to, and controls configuration of, the configuration memory 616. A configuration bitstream produced from the program memory 620 may be coupled to the configuration logic 618 through a configuration port 619. The configuration process of FPGA 602 is also well known in the art.

The DCM blocks 612 provide well-known clock management circuits for managing clock signals within the FPGA 602, such as delay lock loop (DLL) circuits and multiply/divide/de-skew clock circuits. The processor block 614 comprises a microprocessor core, as well as associated control logic. Notably, such a microprocessor core may include embedded hardware or embedded firmware or a combination thereof for a "hard" or "soft" microprocessor. A soft microprocessor may be implemented using the programmable logic of the FPGA 602 (e.g., CLBs 604, IOBs 606). For example, a MICROBLAZE soft microprocessor, available from Xilinx of San Jose, Calif., may be employed. A hard microprocessor may be implemented using an IBM POWER PC, Intel PENTIUM, AMD ATHLON, or like type processor core known in the art.

The processor block 614 is coupled to the programmable logic of the FPGA 602 in a well-known manner. For purposes of clarity by example, the FPGA 602 is illustrated with 12 CLBs, 16 IOBs, 4 BRAMs, 4 DCMs, and one processor block. Those skilled in the art will appreciate that actual FPGAs may include one or more of such components in any number of different ratios. For example, the FPGA 602 may be selected from the VIRTEX-4 family of products, commercially available from Xilinx, Inc. of San Jose, Calif.

Figure 7:
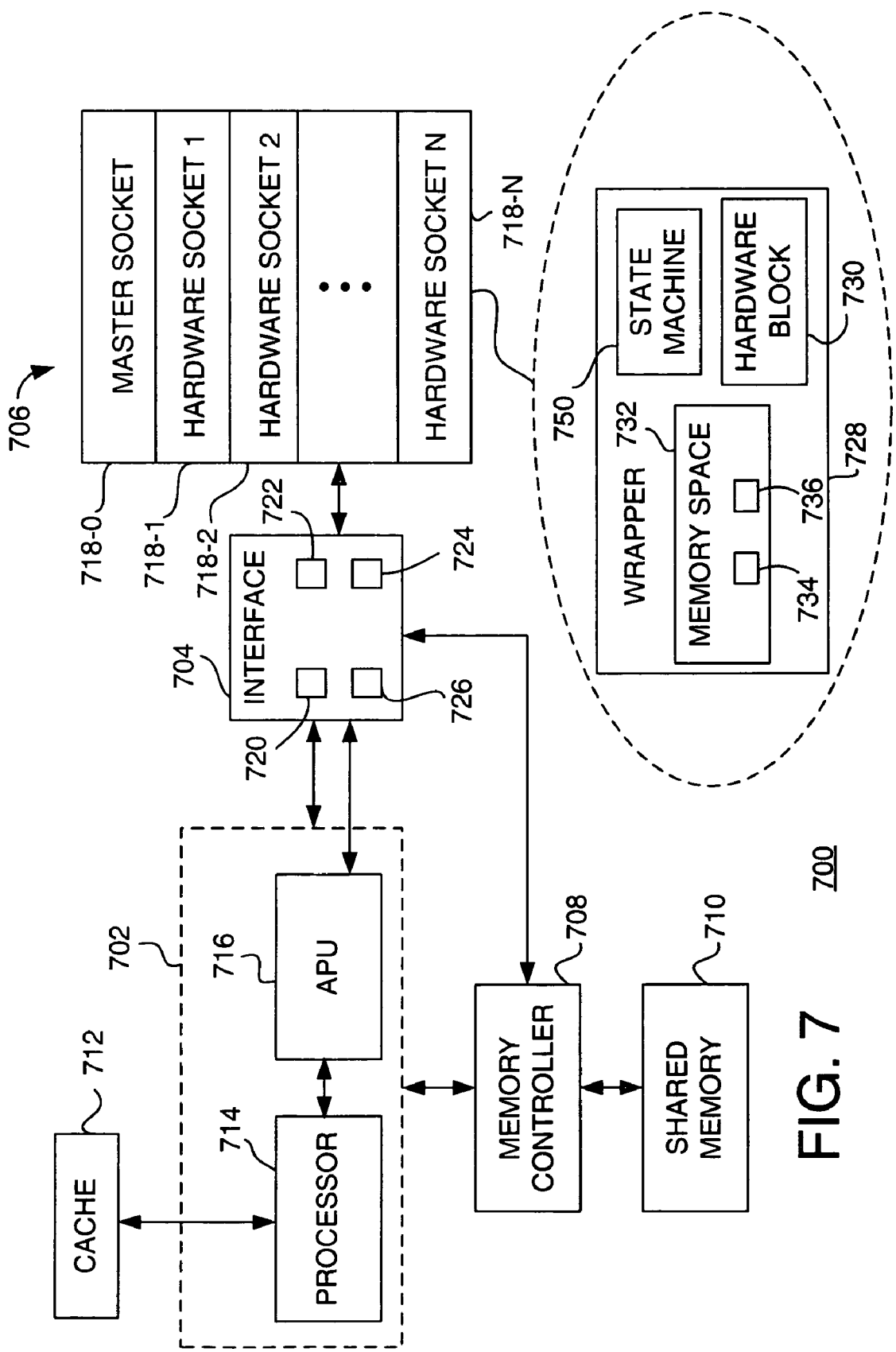
FIG. 7 is a block diagram depicting another exemplary embodiment of a processing system constructed in accordance with one or more aspects of the invention.

FIG. 7 is a block diagram depicting another exemplary embodiment of a processing system 700 constructed in accordance with one or more aspects of the invention. The system 700 may be implemented entirely within a PLD, such as the FPGA 602 of FIG. 6 or the Virtex-4 FPGA available from Xilinx, Inc. of San Jose, Calif. The system 700 comprises a processor block 702, an interface 704, a processing engine 706, a memory controller 708, shared memory 710, and cache memory 712. In one embodiment, the processor block 702 includes a processor 714 and an auxiliary processor unit (APU) 716 (an example of an APU is found in the Virtex-4 FPGA, further details are in co-pending application, U.S. application Ser. No. 10/912,844, entitled "Coprocessor Interface Controller", by Ahmad R. Ansari, et. al., filed Aug. 6, 2004, which is herein incorporated by reference). The processing engine 706 includes sockets 718-0 through 718-N (collectively referred to as sockets 718), where N is an integer. Similar to the embodiment of FIG. 1, the sockets 718 include a master socket 718-0 and N hardware sockets 718-1 through 718-N. In contrast to the embodiment of FIG. 1, the processor 714 and APU 716 are embedded in the PLD, rather than being part of an external computation device. The memory 710 can be either embedded in the PLD or be external to the PLD.

A port of the processor 714 is coupled to a port of the APU 716. Another port of the processor 714 is coupled to a port of the cache memory 712. A port of the processor block 702 is coupled to a port of the memory controller 708. Another port of the APU 716 is coupled to a port of the interface 704. Another port of the interface 704 is coupled to another port of the memory controller 708. Yet another port of the interface 704 is coupled to the processing engine 706. Another port of the memory controller 708 is coupled to a port of the shared memory 710.

In operation, the processor 714 executes software code that makes use of one or more hardware blocks of the processing engine 706. The processor 714 may be any type of microprocessor known in the art. The processor 714 may use the cache memory 712 for storing software instructions and/or local data. In some cases, the software instructions stored in the cache 712 may be fetched from another memory, such as the shared memory 710. The processor 714 may access the shared memory 710 via the memory controller 708. The memory controller 708 is configured to arbitrate access to the shared memory 710 among the processor block 702 and the interface 704.

Some of the software instructions comprise auxiliary instructions that are not executed by the processor 714, but are rather sent by the processor 714 to the APU 716. Notably, an auxiliary instruction may comprise a task to be performed by a socket of the sockets 718 in the processing engine 706. Upon receiving an auxiliary instruction associated with the processing engine 706, the APU 716 forwards the auxiliary instruction to the interface 704. The data to be processed by the processing engine 706 is stored in the shared memory 710.

Figure 9:
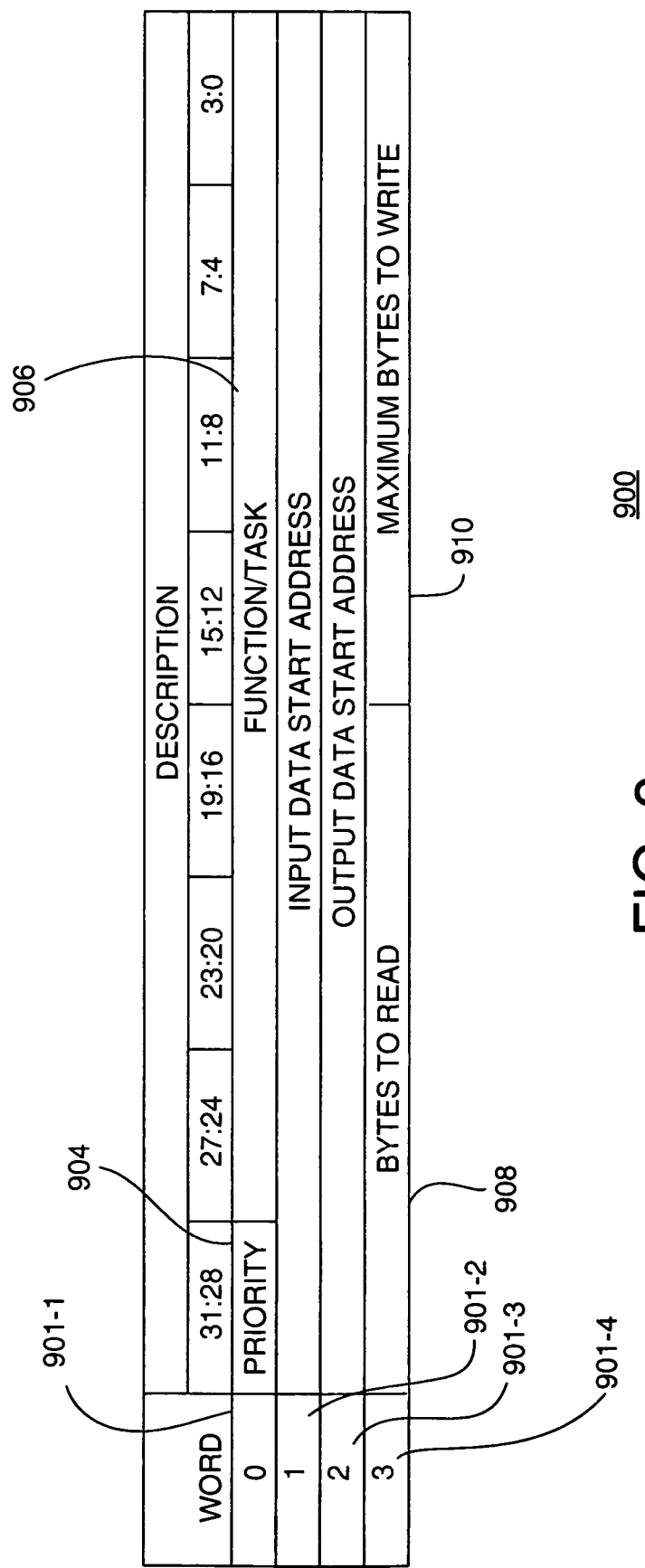
FIG. 9 is a table depicting an exemplary embodiment of an auxiliary instruction in accordance with one or more aspects of the invention.

The interface 704 includes decoder logic 720 for decoding auxiliary instructions received from the APU 716. Notably, FIG. 9 is a table depicting an exemplary embodiment of an auxiliary instruction 900 in accordance with one or more aspects of the invention. The auxiliary instruction 900 comprises four words 901-1 through 901-4 (collectively referred to as words 901). For purposes of clarity by example, each of the words 901 includes 32 bits. It is to be understood that the words may comprise any number of bits.

The word 901-1 includes a priority component 904 and a function/task component 906. The function/task component 906 includes data representative of the particular task to be performed by the processing engine 706. The priority component 904 includes data representative of the priority of the task with respect to a predefined priority scale. The priority component 904 may be used to aid the interface 704 in selecting a socket for performing the task among multiple contending sockets. In the present example, the priority component 904 includes four bits for 16 possible priority levels, and the function/task component 906 includes 28 bits. It is to be understood that the priority component 904 and the function/task component 906 may have other bit-sizes.

The word 901-2 includes data representative of the start address in the shared memory 710 for the input data to be processed by the processing engine 706. The word 901-3 includes data representative of the start address in the shared memory 710 for the output data produced by the processing engine 706 in response to processing the input data. The word 901-4 includes a first component 908 and a second component 910. The first component 908 includes data representative of the number of bytes to be read by the processing engine 706 from the start address of the input data indicated by the word 901-2. The second component 910 includes data representative of the maximum number of bytes to be written to the shared memory 710 by the processing engine 706. In the present example, each of the first component 908 and the second component 910 includes 16 bits. It is to be understood that the first component 908 and the second component 910 may have other bit-sizes.

Returning to FIG. 7, the decoder logic 720 analyzes the first word of the auxiliary instruction to identify the task to be performed and its associated priority. The interface 704 is configured with knowledge of the hardware functionality of each of the sockets 718. Based on this knowledge, the requested function/task, and the priority of the task, the interface 704 notifies the appropriate one of the sockets 718 to begin performing the requested task. In particular, the interface 704 informs the selected socket of the start address in the shared memory 710 for the input data to be processed. The interface 704 processes each auxiliary instruction received from the APU 716 in a similar manner.

The interface 704 further includes memory arbitration logic 722 for arbitrating access to the memory controller 708 among the sockets 718. That is, after a socket receives notification of a task to be performed, the socket requests access to the memory controller 708 (and ultimately the shared memory 710) from the memory arbitration logic 722. The interface 704 also includes processor arbitration logic 724 for arbitrating access to the processor 714 among the sockets 718. For example, a socket may communicate an interrupt to the processor 714. The interface 704 may also include a status register 726 that can be read by the processor 714. The status register 726 may be used to inform the software running on the processor 714 whether a requested task has been completed, as well as only partially completed due to a number of possible reasons (e.g., limited memory space, unsupported features, and the like).

Each of the sockets 718 comprises a hardware block 730 and a wrapper 728. The wrapper 728 provides a standard interface to the hardware block 730. That is, each of the sockets 718 includes a standard interface to its respective hardware block. The wrapper 728 includes a data transfer state machine 750 to communicate with the interface 704 and a memory space 732 having a write-only register file 734, a read-only register file 736. The terms "write" and "read" are defined with respect to the interface 704. That is, the interface 704 stores data to the write-only register file 734, and reads data from the read-only register file 736. Conversely, the hardware block 730 reads data from the write-only register file 734, and writes data to the read-only register file 736. Notably, the memory space 732 does not include read/write block memories, since actual input and output data is not communicated between the processor 714 and the interface 704. Rather, communication between the interface 704 and the hardware block 730 is in the form of an instruction. The shared memory 710 is used to store both the input data and the resulting output data.

The register file memories 734 and 736 are used for writing and reading control signals. The write-only register file 734 is used to store flags and parameters that are required by the hardware block 730 (e.g., a status flag indicating the presence of input data). The read-only register file 736 is used to convey various flags and parameters computed by the hardware block 730 (e.g., a status flag indicating the presence of completed output data). The read-only register file 736 can also contain any information that the hardware block 730 would like to transmit to the processor block 702 (e.g., functional capabilities, estimated performance of specified tasks, etc.). An exemplary configuration for the memory space 732 of a socket is described immediately below with respect to FIG. 8.

Figure 8:
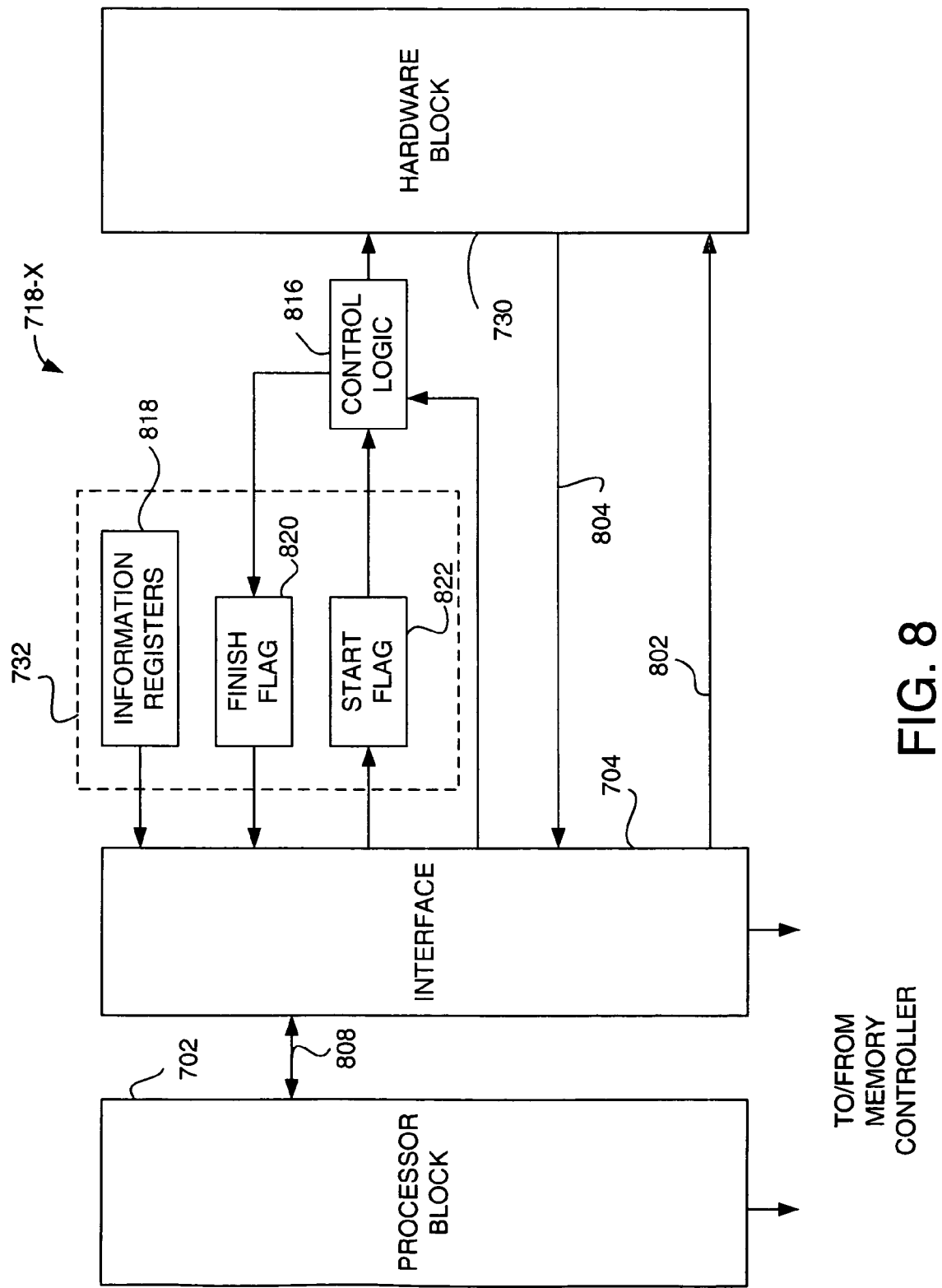
FIG. 8 is a functional block diagram depicting an exemplary embodiment an interface between software running on a processor and a hardware block of the processing system in FIG. 7.

FIG. 8 is a functional block diagram depicting an exemplary embodiment of an interface between software running on the processor 714 and a socket 718-X of the sockets 718 in the processing engine 706. The memory space 732 includes one or more information registers 818, a finish flag register 820, and a start flag register 822. The wrapper 728 for the socket 718-X includes control logic 816. The information registers 818 and the finish flag 820 form the read-only register file space, and the start flag 822 forms the write-only register file space.

The processor block 702 notifies the interface 704 of a requested task via the path 808. The task request includes the start address in the shared memory 710 of the input data, the start address in the shared memory 710 for the output data, and the number of bytes to be read from and written to the shared memory 710. Various protocols may be used to perform the data transfer from the shared memory 710 (e.g., streaming data based on empty/full flags). One method is the use of the start flag register 822. The interface 704 sets the start flag register 822 in response to the task request and communicates the address and byte count information to the control logic 816. The control logic 816 detects the state of the start flag register 822 and signals the hardware block 730 to begin processing input data in the shared memory 710 at the start address of the input data. The hardware block 730 receives input data from the memory controller 708 through the interface 704 via the path 802. The hardware block 730 sends data to be stored in the shared memory 710 to the interface 704 via the path 804.

The hardware block 730 signals the control logic 816 after processing is complete and output data is stored in the shared memory 710. In response, the control logic 816 sets the finish flag register 820. Various protocols may be used to perform the data transfer to the shared memory 710 (e.g., streaming data based on empty/full flags, interrupt signals sent from the interface 720 to the processor 714). One method is the use of the finish flag register 820. In one embodiment, the interface 704 periodically polls the state of the finish flag register 820 and set the status register 726 to indicate that the task has been completed in response to the finish flag register 820 being set. The information registers 818 may be used to store data indicative of the capabilities of the hardware block 730. For example, the information registers 818 may be configured to store a list of task(s) that the hardware block 730 is capable of performing, as well as a cost function related to how fast the hardware block 730 can perform the task(s).

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

The invention claimed is:

1. Apparatus for communication between a set of hardware blocks and a processor in an integrated circuit having programmable logic, comprising:

a shared memory;

a memory controller for controlling access to the shared memory;

an interface having status register logic for indicating processing capabilities of the set of hardware blocks, the interface configured to receive auxiliary instructions from the processor indicative of requested tasks, select hardware blocks in the set of hardware blocks capable of performing the requested tasks in response to the processing capabilities in the status register logic, notify the selected hardware blocks of the requested tasks, and arbitrate access to the memory controller among the hardware blocks; and a set of wrappers, each of the wrappers interfacing a respective one of the hardware blocks and including a data transfer state machine configured to control communication between the interface and the respective hardware block, and a memory space configured to store control data generated by both the interface and the respective hardware block.

2. The apparatus of claim 1, further comprising:

an auxiliary processor unit (APU) configured to receive the auxiliary instructions from the processor and to provide the auxiliary instructions to the interface.

3. The apparatus of claim 1, wherein each of the auxiliary instructions includes: a function/task component; and address data for addressing the shared memory, and wherein the interface comprises:
  decoder logic for decoding the function/task component and address data from each of the auxiliary instructions.

4. The apparatus of claim 3, wherein each of the auxiliary instructions further includes a priority component and byte count data.

5. The apparatus of claim 4, wherein the address data includes a first start address for data to be processed and a second start address for result data, and wherein the byte count data comprises a first number of bytes to read starting at the first start address and a second number of bytes to write starting at the second start address.

6. The apparatus of claim 1, wherein the interface is configured to, for each of the auxiliary instructions, select a hardware block in the set of hardware blocks for performing a requested task of the requested tasks.

7. The apparatus of claim 1, wherein the interface includes arbitration logic for arbitrating access to the processor among the set of hardware blocks.

8. The apparatus of claim 1, wherein status register logic further indicates processing status of the set of hardware blocks.

9. A method of communication between hardware blocks and a processor in an integrated circuit device, comprising:
  storing processing capabilities of the hardware blocks in an interface coupled between the hardware blocks and the processor;
  receiving an auxiliary instruction from the processor indicative of a requested task by the interface;
  selecting a hardware block of the hardware blocks capable of performing the requested task in response to the processing capabilities;
  configuring a memory space in a wrapper around the hardware block to start processing of the requested task in response to the processing capabilities by the interface
  accessing a memory shared between the hardware blocks and the processor to perform the requested task based on the memory space as configured; and
  detecting, within the memory space of the wrapper, data indicative of the requested task being complete.

10. The method of claim 9, wherein the auxiliary instruction is received from an auxiliary processor unit (APU) associated with the processor.

11. The method of claim 9, wherein the auxiliary instruction includes: a function/task component; and address data for addressing the memory, and wherein the step of selecting comprises:
  decoding the function/task component and address data from the auxiliary instruction to select the hardware block.

12. The method of claim 11, wherein the auxiliary instruction further includes a priority component and byte count data.

13. The method of claim 12, wherein the address data includes a first start address for input data to be processed and a second start address for result data, and wherein the byte count data comprises a first number of bytes to read starting at the first start address and a second number of bytes to write starting at the second start address.

14. The method of claim 13, wherein the step of accessing comprises:
  reading the input data from the memory to the hardware block from the first start address in accordance with the first number of bytes; and
  writing the result data to the memory from the hardware block to the second start address in accordance with the second number of bytes.

15. An integrated circuit device, comprising:
  a processor;
  a processing engine having a set of hardware blocks configured in the integrated circuit device;
  a shared memory;
  a memory controller for controlling access to the shared memory;
  an interface having status register logic for indicating processing capabilities of the set of hardware blocks, the interface configured to receive auxiliary instructions from the processor indicative of requested tasks, select hardware blocks capable of performing the requested tasks in response to the processing capabilities stored in the status register logic, notify the hardware blocks of the requested tasks, and arbitrate access to the memory controller among the set of hardware blocks; and
  a set of wrappers, each of the wrappers providing an interface to interfacing a respective one of the hardware blocks and including a data transfer state machine configured to control communication between the interface and the respective hardware block, and a memory space configured to store control data generated by both the interface and the respective hardware block.

16. The integrated circuit device of claim 15, further comprising:
  an auxiliary processor unit (APU) configured to receive the auxiliary instructions from the processor and to provide the auxiliary instructions to the interface.

17. The integrated circuit device of claim 15, wherein each of the auxiliary instructions includes: a function/task component; and address data for addressing the shared memory, and wherein the interface comprises:
  decoder logic for decoding the function/task component and address data from each of the auxiliary instructions.

18. The integrated circuit device of claim 17, wherein each of the auxiliary instructions further includes a priority component and byte count data.

19. The integrated circuit device of claim 18, wherein the address data includes a first start address for data to be processed and a second start address for result data, and wherein the byte count data comprises a first number of bytes to read starting at the first start address and a second number of bytes to write starting at the second start address.

20. The integrated circuit device of claim 15, wherein the status register logic further indicates processing status of the hardware blocks.

* * * * *